US010068297B2

(12) United States Patent
Hull Roskos (10) Patent No.: US 10,068,297 B2
(45) Date of Patent: Sep. 4, 2018

(54) REMOTE NON-INTRUSIVE OCCUPANT SPACE MONITORING SYSTEM

(75) Inventor: Julie Hull Roskos, Forest Lake, MN (US)

(73) Assignee: Honeywell International Inc., Morris Plains, NJ (US)

( * ) Notice: Subject to any disclaimer, the term of this patent is extended or adjusted under 35 U.S.C. 154(b) by 1565 days.

(21) Appl. No.: 12/969,453

(22) Filed: Dec. 15, 2010

(65) Prior Publication Data

US 2012/0158618 A1 Jun. 21, 2012

(51) Int. Cl.
G06Q 20/06 (2012.01)
G06Q 50/06 (2012.01)
G06N 5/02 (2006.01)

(52) U.S. Cl.
CPC .............. *G06Q 50/06* (2013.01); *G06N 5/02* (2013.01)

(58) Field of Classification Search
None
See application file for complete search history.

(56) References Cited

U.S. PATENT DOCUMENTS

| 4,317,175 | A | 2/1982 | Sterling et al. | |
|---|---|---|---|---|
| 4,672,555 | A | 6/1987 | Hart et al. | |
| 4,858,141 | A | 8/1989 | Hart et al. | |
| 9,194,899 | B2 * | 11/2015 | Zoldi | G01D 4/004 |
| 2008/0309243 | A1 | 12/2008 | Cooley et al. | |
| 2009/0072985 | A1 * | 3/2009 | Patel | H04B 3/544 |
| | | | | 340/657 |
| 2010/0211222 | A1 * | 8/2010 | Ghosn | G01D 4/002 |
| | | | | 700/276 |
| 2011/0040785 | A1 * | 2/2011 | Steenberg | G05B 23/0235 |
| | | | | 707/769 |
| 2012/0083930 | A1 * | 4/2012 | Ilic | G06Q 30/06 |
| | | | | 700/287 |

OTHER PUBLICATIONS

Ruzzelli, A.G., Nicolas, C., Schoofs, A., O'Hare, G.M.P., "Real-Time Recognition and Profiling of Appliances through a Single Electricity Sensor", Sensor Mesh and Ad Hoc Communications and Networks (SECON), 2010 7th Annual IEEE Communications Society Conference on, Jun. 21-25, 2010, pp. 1-9.*

(Continued)

*Primary Examiner* — Alan Chen
(74) *Attorney, Agent, or Firm* — Seager Tufte & Wickhem LLP (57) ABSTRACT

A system for remote non-intrusive occupant space monitoring. The system may have sensors and other mechanisms for non-intrusively obtaining information by capturing utility and communication signals, images, light, sound, environmental factors, background information, and so on, about a space and its occupants. The obtained information may be locally or remotely analyzed and modeled by a processor. Models of buildings, behavior, and power systems from the processor may be compared with pre-defined models to infer further information about the space and its occupants. Also, behavioral information may be obtained, inferred and/or learned. The models may be updated with the obtained, inferred and learned information.

20 Claims, 6 Drawing Sheets

(56) References Cited

OTHER PUBLICATIONS

Khee Poh Lam, Michael Höynck, Bing Dong, Burton Andrews, Yun-Shang Chiou, Rui Zhang, Diego Benitez and Joonho Choi, "Occupancy Detection Through an Extensive Environmental Sensor Network in an Open-Plan Office Building", Proceedings of Eleventh International IBPSAA Conference, Building Simulation 2009, Glasgow, Jul. 30, 2009, pp. 1452-1459.*

Danny Hughes, Ka Lok Man, Kevin Lee, Jo Ueyama, "A Wireless Sensor Network Based Green Marketplace for Electrical Appliances", 2010 Second International Conference on Future Networks, Apr. 3, 2010, pp. 299-303.*

Mahmoud A. Al-Qutayri and Jeedella S. Jeedella, "Integrated Wireless Technologies for Smart Homes Applications", from Al-Quatayri, Ed., Smart Home Systems, CC BY-NC-SA, Feb. 2010, pp. 17-42.*

Kiichiro Tsuji, Fuminori Sano, Tsuyoshi Ueno and Osamu Saeki, Takehiko Matsuoka, "Bottom-Up Simulation Model for Estimating End-Use Energy Demand Profiles in Residential Houses", Panels of the 2004 ACEEE Summer Study on Energy Efficiency in Buildings, Panel 2. Residential Buildings: Program Design, Implementation, and Evaluation, 2004, pp. 1-14.*

* cited by examiner

REMOTE NON-INTRUSIVE OCCUPANT SPACE MONITORING SYSTEM

BACKGROUND

The invention pertains to obtaining information and particularly obtaining information about a building and its occupants. More particularly, the invention pertains to monitoring the building and the occupants from the information obtained.

SUMMARY

The invention is a remote non-intrusive occupant space monitoring system. The system may have sensors and other mechanisms for non-intrusively obtaining information by capturing utility and communication signals, images, light, sound, environmental factors, background information, and so on, about a space and its occupants. The obtained information may be locally and/or remotely analyzed and modeled by a processor. Models of buildings, behaviors and a power system from the processor may be compared with pre-defined models to infer further information about the space and its occupants. Also, behavioral information may be obtained, inferred and/or learned. The models may be updated with the obtained, inferred and learned information.

DESCRIPTION

Use of non-intrusive monitoring appears attractive for attaining information on others in a building. A building may be a residence, commercial building, or industrial facility or complex. It may be costly and difficult to install appropriate devices in homes or other buildings in order to monitor occupant behavior. Additionally, residents of a space often do not necessarily want additional technology installed in their purview.

The present system may use sensing, analysis, modeling, storage, and communications outside of a residence or building in order to continuously monitor behavior inside of the building without a need for instrumentation or equipment in the building. The system may measure and analyze energy use and other factors about the building, inside and outside of the building, and use models of typical equipment to infer or devise what is occurring in the building. The system may also create human behavior models based upon these sets of data in order to build an occupant behavior model. Models (i.e., of the utility power system, building and occupant) may use additional data in order to develop and improve accuracy of the models. Models may be built and trained around human behavior as well as building and power system behavior. The present system may allow for an accurate representation of equipment usage and human behavior without instrumentation situated inside of the building.

For large and more complex sites, it is possible to use a combination of published data about a commercial equipment manufacturer, a power system model of the adjacent area (or the area itself if this data is available), domain knowledge and additional data as listed herein (i.e., temperature, solar index, building information such as type, construction, and so on). Also, any data that is externally available is fair game, including security system data (which may include occupancy), weather data; and for more detailed analysis, the data may include floor plan data, schematics, and the like.

Sensing, models and analyses may have varying complexity depending upon the application. One may think of the complexity in terms of "planes", where the simplest plane is the residential application and may use, for example, a simple current sensor to capture current in the most inexpensive fashion possible, and then map the current signature to known equipment in a residential setting, build up the equipment list, and then map the likely behaviors through known patterns of equipment (for instance, furnace fans cycle at a predictable rate, given ambient temperature, and a furnace model can be quickly created given enough historical measurements). So, when the system is installed, it may initially go through a period of training to train the furnace model for a particular home based upon ambient temperature and actual cycling detected. Given a few days of measurements, a rudimentary model may be used to determine when the person gets up, leaves and returns home, assuming the person changes the temperature setpoints at home. Over time, this model may be improved as more data are collected the longer the system is installed. Once equipment is identified, models of the human behavior can be built up. Some of the models may already exist and need to be tweaked. The models may be built up over time. Models may update themselves with received data via a learning process.

Equipment energy use models might be used to begin with in order to identify what equipment is running, which may identified through the use of pattern matching algorithms that look for a shape with statistically flexible parameters, such as wavelength, amplitude frequency, harmonics, and so on. For instance, a visual query language (VQL) algorithm (available from Honeywell International Inc.) may be used for this pattern matching. An existing model may again be tuned specifically for the site, once the equipment is identified in order to reduce noise. In addition to equipment models, an electric model may be developed using commercially available power system modeling software which could include both source and load components. If information is known regarding the power system components on the site, the components may be included (e.g., transformers, switchgear, and so on). If not, the components may be developed through inference based upon the behavior of the end site's power system due to system level (substation and higher) disturbances. This model may be refined after data are collected as well. The equipment model data may be included within the power system model of data in order to build up an accurate representation of the electrical characteristics of a site. An initial simple model may begin with black boxes indicating unknown loads (e.g., equipment, plug loads, lights, and so forth) and be refined to reflect their proper characteristics as more information becomes available including ongoing electric use data, external data, domain analysis, and so on.

There may be a combination of electric power systems models with other models such as predefined predictive, regression, and so forth. One component may have several types of models. For instance, a transformer may have a behavior model for electrical characteristics and a behavior model for mechanical characteristics. There may be various performance models for a piece of equipment. The performance models may be used to identify specific equipment, such as a chiller. The may be several types of models for a power system such as those including environment versus equipment.

The exact sensor or sensors which may be used in the system might vary upon the application as well. If it is a simple residential application, the quality of the measurements would not necessarily be as high since there often is not much equipment and thus it can be relatively easy to differentiate what is or is not running (so the system can be less expensive). Also the need to measure and harmonics is less likely to be needed. On the other hand, if one is trying to determine what equipment is running (including a power system configuration) within a large campus or industrial facility, highly accurate sensor data may be required along with more complex analysis, including domain analysis.

For complex applications, different sensor sets outside the facility might be used such as one or more types of fiber optic current sensors (which may be based upon Faraday effect) and fiber Bragg gratings installed on magnetorestrictive rods. Infrared sensors may be used to make measurements—at least coarse measurements for current based upon temperature increases in the conductors based upon energy usage. Different types of sensors may be used depending upon the application. A combination of sensors and techniques including a Rogowski coil for measuring alternating current (AC) or high speed current pulses may be used. High frequency data may be required in order to measure, store and analyze harmonics to determine the properties of both the equipment and power systems equipment within an installation. If the voltage is unavailable for direct measurement, temperatures of the associated equipment may be measured through various techniques in order to determine both power usage as well as harmonics (taking ambient conditions into account). For example, the temperatures in the windings of a transformer will increase greatly when there is a large number of harmonics in effect. Infrared sensing techniques may be used to infer such values.

The system may sense current at a high frequency from the electric power line feeding a building. Other parameters and values may be sensed. The data extracted from power line signals may be processed, analyzed and stored. Models may be developed from the data and used in the analysis. The models may be updated over time. Data may be communicated externally via convenient communications media which may include cell, PLC, cable or RF to remote places to be used in reports on equipment and human behavior at the non-intrusively monitored building of a facility. Generally, the mode of communication is not necessarily critical, as it may depend upon the application. The present system may be flexible to support many physical forms of communication. The system may be modified by the present remote system to update models. The remote or central site of the system may gather information from virtually all of the installed sites, and as the system learns more about equipment behavior with respect to power system dynamics, equipment behavior, or people behavior, it may push these learnings back to one or more of the installed systems to update the inherent models.

Basically, the system may provide an ability to build a power system model of the bulk power system (utility side) and of the system connected (which is a building or group of buildings) and support structures. Both of these models may be modified over time, but the bulk side is more stable due to its size. The connected system may be modeled as a single block or can be broken down into as many "load" blocks as is needed to determine what is going on in the building. These load blocks may be broken out in several ways. The equipment itself may be a load and be determined based upon signatures of its electric use. If there is too much overlapping equipment to do this cleanly, this may be combined with the behavior analysis of the loads based upon bulk side system disturbances. Additional information may be used including ambient conditions. Once all loads are identified in the building, human behavior may start to be identified based upon load characteristics. If human behavior is the core need for the application, the other data such as gas, water, and so forth, may be used to make more decisions.

A boundary of a customer's premise may or may not include one or more transformers. The customer's premise may be a single residential home, commercial building, campus, industrial facility, or micro grid. The one or more transformers may be dictated by the number of phases of electric power to be measured. The number of phases required to be measured may depend upon the installation and where the system is sensing; but for many applications, three phase power may be measured.

For a simple non-intrusive monitoring system, the analysis of data attained about an element in a building may be automated. For a more complex system, a domain expert may be in a loop for analysis, modeling and visualization of data attained about the element in or associated with a building. A monitored element may be a person, piece of equipment, system, system of systems, or any combination of such.

The system may allow for many capabilities which include, but are not limited to, identifying equipment and/or processes running inside a facility, performing condition-based maintenance, and developing facility models and human models including those of various behaviors.

There may be an ability of the system to update and create new models based upon learned data, in terms of training and learning purposes, as well as the creation of new models based upon information after the system is installed at a customer site. Examples may incorporate: 1) An ability to update the power system model based upon building and system reactions to actual physical disturbances on the line; 2) An ability to determine the best regression model based upon statistical outcome and data available (choosing of independent parameters for the model); and 3) An ability to take user input and modify the evidence used to a calculation or model, or model component used.

An example may elucidate one capability of the present system. A simple case may have only one monitored variable. In order to increase fidelity of the model, additional sensing components can be added.

An output may include patterns of behavior, which can be in a context of time of day, day of week, general pattern of movements, and so forth. A basis for patterns of behavior of a person or persons may include data about lights, TV, refrigerator, washer/dryer, and other appliances. This data may be noted, measured and/or inferred from monitoring electrical power to a residence of the person or persons.

In terms of how to determine what equipment is running based upon sensor data, there are several approaches that may be used: For the most simple of data, it may be easy to set up a pattern matching algorithm with statistical bounds to determine when typical equipment are turning on/off such as refrigerator motors, furnace fans, and the like. It may also easy to tell what a dishwasher, water heater, washing machine, and so forth, look like without a detailed model to go from.

A power system model may be used as part of the present analysis. This model and other models may be updated through real-time analysis of facilities, buildings and electric power system responses due to power system disturbances coming from the electric utility side of the system.

Figure 1:
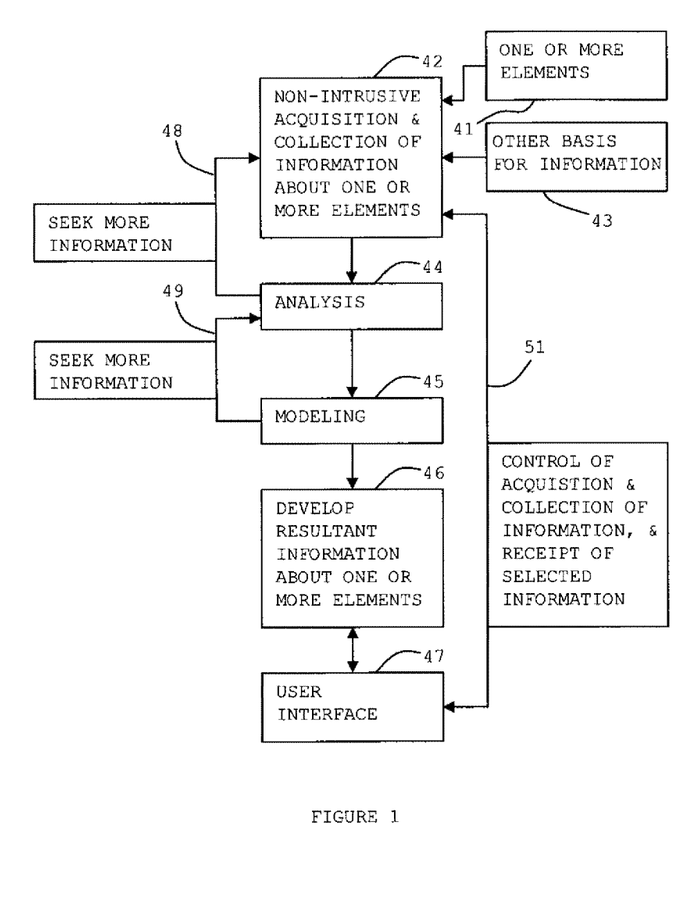
FIG. 1 is a block diagram of a non-intrusive acquisition collection system.

FIG. 1 is a block diagram of an illustrative example of non-intrusive acquisition collection system. A mechanism 42 may provide non-intrusive acquisition and collection of information about an element or elements 41. Information about element or elements 41 from another basis 43 may be acquired and collected by mechanism 42. An analysis module 44 may be connected to mechanism 42. Module 44 may analyze information about element or elements 41 from mechanism 42. Module 44 may utilize various techniques and in processing and analysis. Module 44 may request or seek more information from mechanism 42 via a line 48. The additional information may be updated information or be more detailed. Such information requested or sought may contribute to an interactive process of analyzing by module 44 to provide an output which meets certain criteria. The criteria may state a level of detail, quality, current state, and so forth. An output of module 44 may be information useful for modeling at a module 45. More information for modeling may be requested or sought from analysis module 44 via line 49. Also, further information for modeling by module 45 may be requested from mechanism 42 via line 49, module 44 and line 48.

Module 45 may provide models of behavior, status and so on about an element or elements 41. The models may be a basis for future behavior, status, and so on, about the element or elements 41, developed as resultant information at a development module 46. Module 46 may develop other resultant information about the element or elements 41. The resultant information may go to a user interface 47. Interface 47 may incorporate a display, a keyboard, and a processor for running applications relative to the resultant information, and so on. User interface 47 may control acquisition and collection of information from mechanism 42 via a line 51. Interface 47 may control receipt of selected information about the element or elements 41 via line 51. User interface 47 may provide and/or control other activity and processes of the present system. User interface 47 may also control the system's interaction with outside entities.

Figure 2:
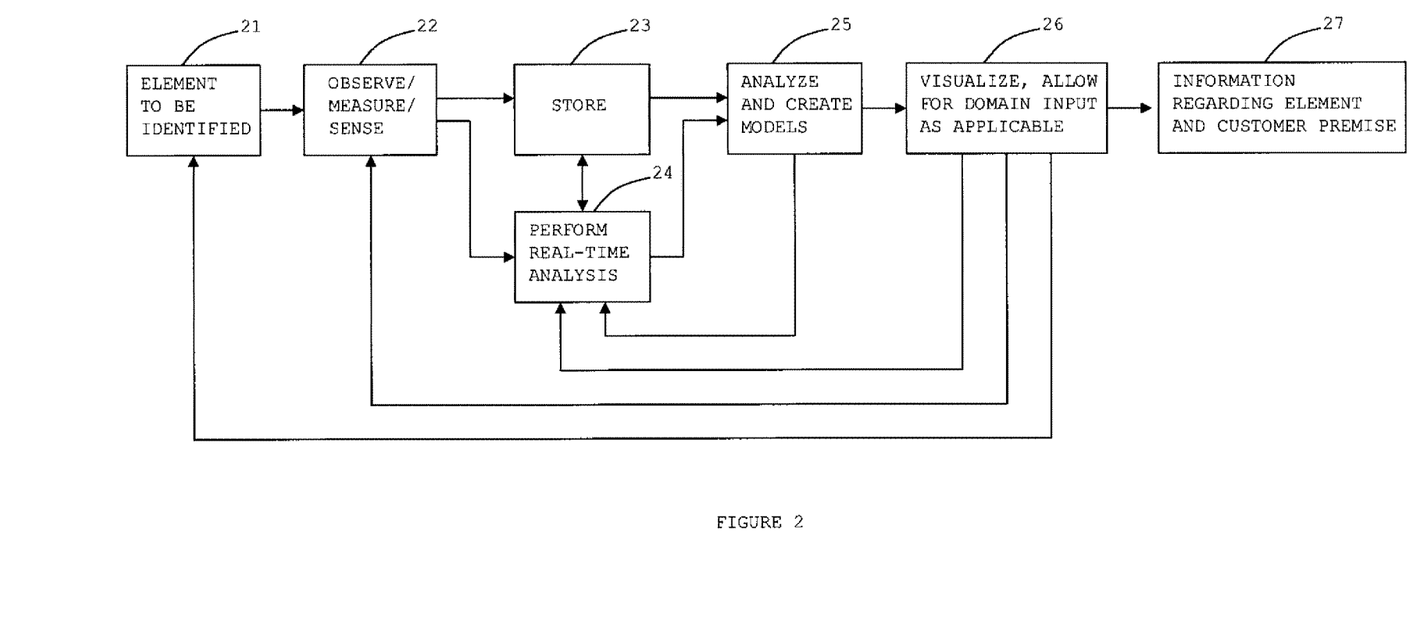
FIG. 2 is a flow diagram which shows an operation of the non-intrusive acquisition collection system.

FIG. 2 is a flow diagram which shows an operation of the present system. One or more elements may be identified for sensing at a symbol 21. An element may be a person, a piece of equipment, system, system of systems, or any combination of these or other items. As indicated at step or symbol 22, the element may be observed, measured and/or sensed. Examples of these activities may occur at a sensor module 17 of FIGS. 5 and 6. Outputs of the activities at symbol 22 may go to storage as indicated by symbol 23. The outputs may also go for real-time analysis according at step or symbol 25. Storage noted at symbol 23 and real-time analysis at step or symbol 24 may interact with each other. Outputs from storage and analysis as indicated at symbols 23 and 24 may go where the outputs may be analyzed and models created as indicated by symbol 25. Information about the models from symbol 25 may be fed back for further real-time analysis, updating and improvement at symbol 24. As more is learned about the element and the model is improved, the data that is sensed or measured, the analysis and the models themselves may be enhanced or altered, including adding additional data points to improve accuracy. Additionally, in the case where the element consists of multiple elements (as in a system of systems), additional elements to be identified may occur).

Results from analysis and creation of models of symbol 25 may go for visualization, allowance for domain input as applicable, and reporting relative to analysis and models, among other things, at symbol 26. The output of activities noted at symbol 26 may be further analyzed as indicated at symbol 24. A result of the activities at symbol 26 may be information regarding the element and the customer's premise as indicated at symbol 27.

The results of visualization and allowance for domain input as applicable may be fed to symbol 21 where the element is to be identified and symbol 22 where the element is to be observed, measured and/or sensed.

The present system may allow for many capabilities which may incorporate, but are not necessarily limited to, identifying equipment and/or processes operating inside a facility, performing condition-based maintenance, and developing human models including behaviors.

Figure 3:
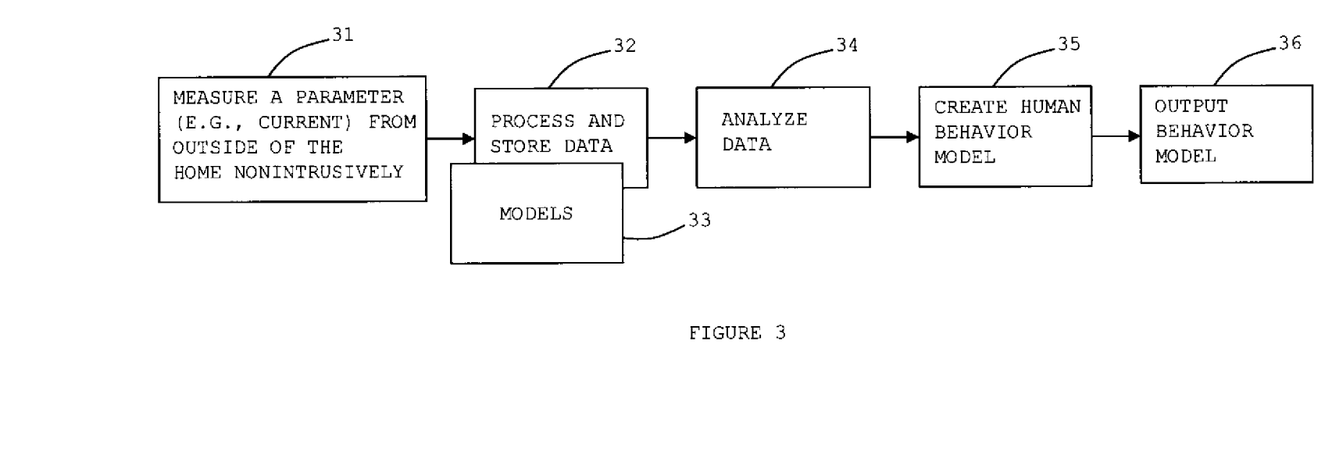
FIG. 3 is a flow diagram of an illustrative example to elucidate a particular parameter acquisition, analysis and modeling capability.

FIG. 3 is a diagram showing an illustrative example to elucidate a capability. The example is a simple case having just one monitored parameter or variable, such as electrical current. However, to increase fidelity of a model, additional sensing components for monitoring more variables may be added to the system. An example parameter, such as current, may be non-intrusively observed and measured from outside of, for instance, a home, as indicated by step or symbol 31. Observance and measurement data of, for example, current to the home, may be processed and stored as noted at symbol 32. Models at symbol 33 may be developed from data as noted in symbol 32. The models, once developed, may be improved over time upon additional collection of current data and further processing.

Processed data may be analyzed as indicated at symbol 34. Results from data analysis at symbol 34 may be a basis for creating a human behavior model as indicated at symbol 35. Models noted at symbol 33 may be considered in behavior model creation. The behavior model may be output from the system as indicated at symbol 36. The output behavior model may reflect a pattern of behavior in the context of the time of day, day of the week, a general pattern of movements, and other items. The behavior model may be derived primarily from current observance and measurement data which may show information such as times and amount of usage of lights, television, refrigerator, washer, dryer, and other devices. One way to determine what equipment (including power systems equipment and/or end use equipment) is running in a facility may be by seeing how it reacts to system disturbances (e.g., power system disturbances). Reaction of equipment, occupants and other elements, to disturbances and disruptiveness may also be detected, analyzed and modeled. The disturbances may be of normal occurrence or purposively introduced into the power supplied to the facility, space or customer system. For example, if there is a low voltage condition, capacitor bank switching, or other power system change or disturbance, the customer system reaction may tell one a great deal about what is installed in terms of onsite generation, power instrumentation, equipment (e.g., motors, and so forth), and about occupants, people and other elements.

Figure 4:
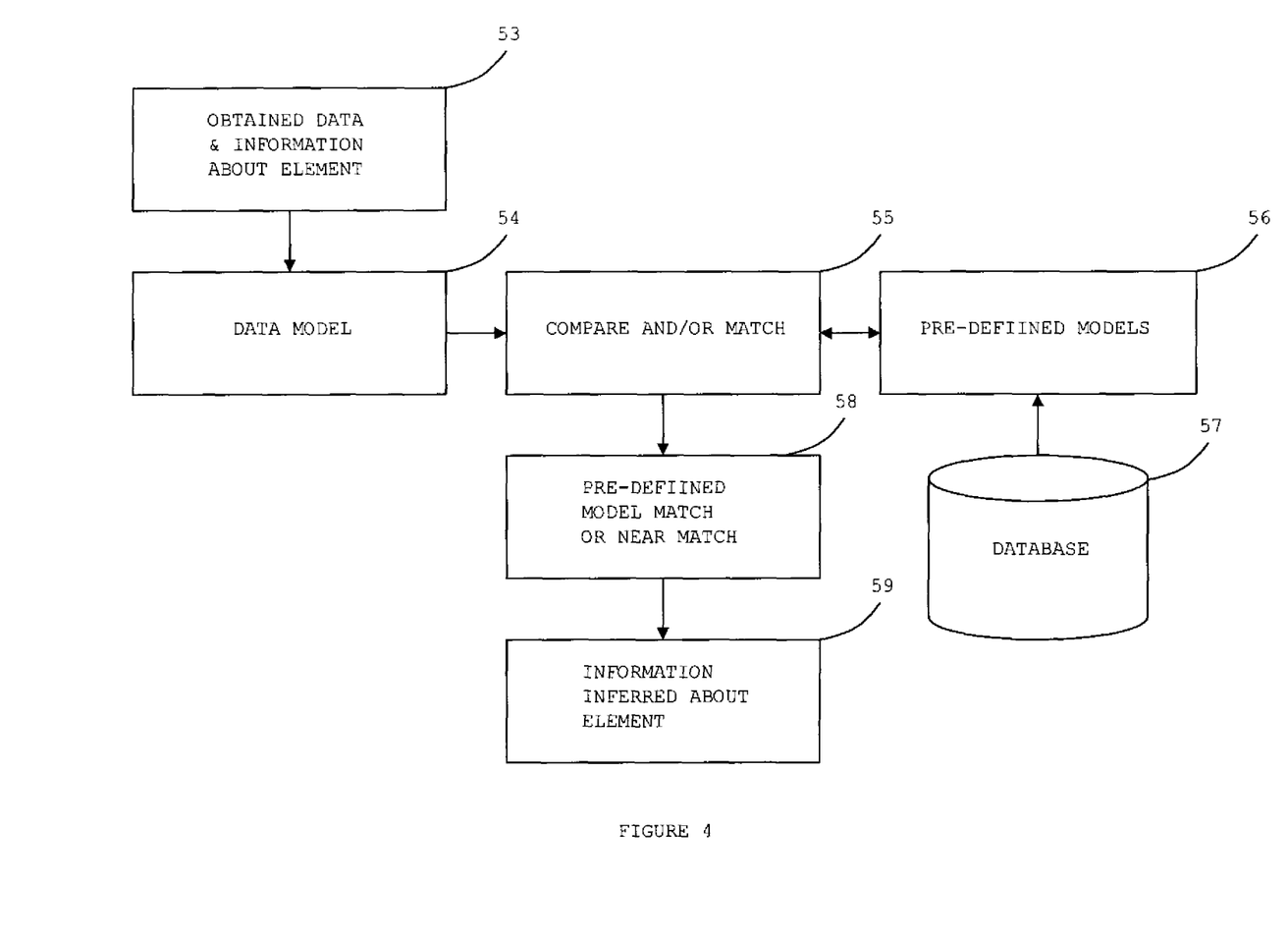
FIG. 4 is an illustrative block diagram of an example for modeling of an element so as to infer further information about the element.

FIG. 4 is an illustrative block diagram of an example for modeling from an element, such as a space and/or occupant, so as to infer information about the element which may be referred to as a customer of power usage. Obtained data and information at symbol 53 may be obtained about the element and processes into a data model at symbol 54. The data model may be compared and/or matched at symbol 55 with pre-defined models 56 from a database 57. The predefined models may be many types of models at the component or analytic model, where the component or aspect to be modeled could be a building, the power system itself, specific equipment or systems, or human behavior and the analytic model may include statistical models, power system models (physics-based), building envelope models, and neural networks, to name a few. The result of the comparison or matching may be one or more pre-defined model matches or near matches at symbol 58. From such a match or near match, information associated with the match or near match may be inferred at symbol 59 about the element. New models might be created over time, either from within the system (as in when a new piece of equipment is identified) or by an external user or the remote site.

The models may include power system models, equipment models, individual human behavior models and collections of these. Depending upon the application, this may be very simple—where one is looking at a particular piece of equipment and its condition over time. Or it may be more hierarchical in nature, where one is looking at a person's behavior, so one may first build up the equipment model and system model, then each of the human behaviors and finally the collection of those behaviors.

Figure 5:
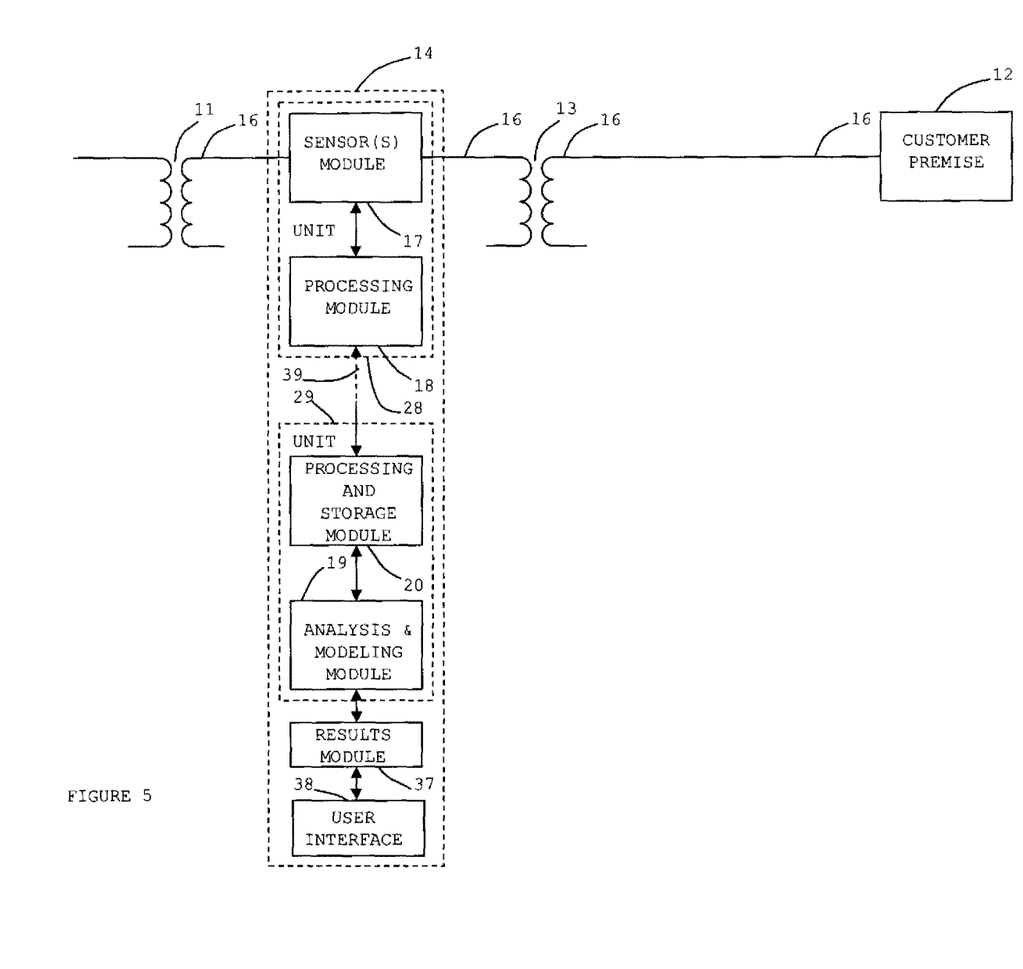
FIGS. 5 and 6 are diagrams of an illustrative example using electrical power as a basis for non-intrusively obtaining information about an element.
Figure 6:
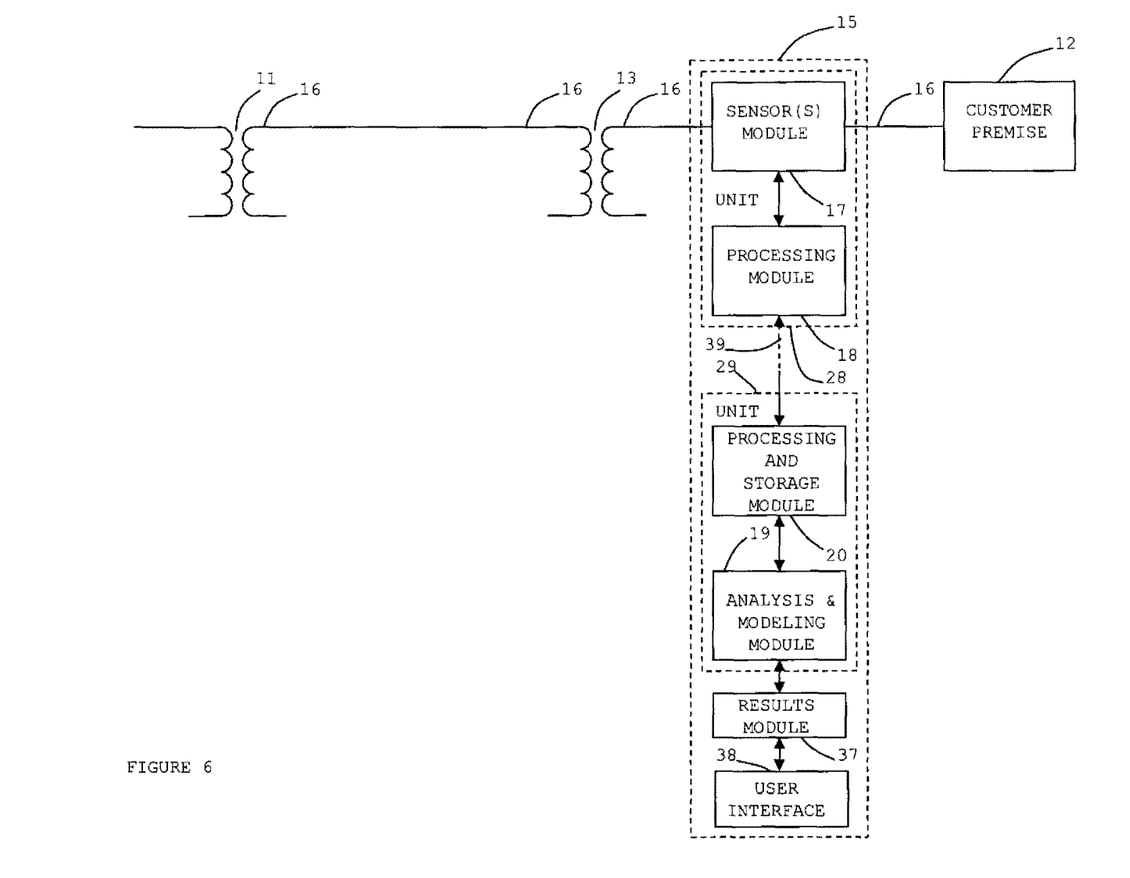

FIGS. 5 and 6 are diagrams of an illustrative example of the present system. The example may use current as a basis for non-intrusively obtaining information about an element. Current at a certain voltage (i.e., power) may come from a substation or distribution transformer 11 and be provided to a customer's premise 12 via a power line 16. Also, there may be a site transformer 13 along power line 16 located on or off the premise 12. A sensor and processing arrangement 14 of FIG. 5 may be coupled to a power line 16 before the site transformer 13 or an arrangement 15 of FIG. 6 may be connected to power line 16 between site transformer 13 and the premise 12, particularly if the site transformer 13 is not on the customer's premises. The customer's premises may be a single residential home, a commercial building, a campus, an industrial facility, micro grid, or other place. Often, just one arrangement 14 or 15 would be used even though both could be used in one configuration.

Sensor and processing arrangement 14 may incorporate a sensor module 17 coupled to the power line 16, a processing module 18 connected to sensor module 17, and a processing and storage module 20 connected to processing module 18 via a line 39. Modules 17 and 18 may be together in an acquisition unit 28. An analysis and modeling module 19 may be connected to the processing and storage module 20. Modules 19 and 20 may be together in a processor unit 29. Conveyance of signals between acquisition unit 28 and processor unit 29 may be by cable, RF, or other approaches, as represented by line 39. A results module 37 may be connected to the analysis and modeling module 19. From results module 37 may be information provided to a user interface 38.

Arrangement 15 may similarly incorporate a sensor module 17, a processing module 18 connected to sensor module 17, a processing and storage module 20 connected to processing module 18, and an analysis and modeling module 19 connected to processing and storage module 20. A results module 37 may be connected to the analysis and modeling module 19. From results module 37 may be information provided to a user interface 38. Other "external" data that might be used could either be entered from the user interface 38 and into the processing and storage module 20 (accessed remotely), or could be gathered and sent to the processing and storage module 20. The "unit" boxes may be either local or remote to the line being measured, and may be a combination of local and remote unit boxes with some processing/storage and analysis occurring locally for high frequency and harmonic data and some remotely (to protect the data at a central area).

Sensor module 17 may have one or more sensors. Processing module 18 may be local to the sensor module 17. Modules 17 and 18 may be together in an acquisition unit 28. Processing and storage module 20 may be remotely located from transformer 11 or 13 along with the analysis and modeling module 19. Module 18 may be a preprocessor of sensor signals for conveyance along a line 39 to the processing and storage module 20. Conveyance of signals between units 28 and 29 may be by cable, RF, or other approaches, as represented by line 39. Arrangements 14 and 15 may be similar to each other but different relative to placement. Either arrangement 14 or 15 may be used alone, or both arrangements, under certain circumstances, may be used relative to non-intrusive monitoring of premise 12.

To recap, there may be a remote non-intrusive monitor of a space for occupants, having a non-intrusive sensor module for monitoring a space, and a processor connected to the sensor module. The sensor module may provide signals representative of electrical power used at the space. The signals representative of the electrical power may be analyzed by the processor. Analysis by the processor of the signals may result in information about a space and/or an element, component, environment, and/or occupant, if any, of the space.

If the electrical power used at the space contains disturbances from within or outside the space which are indicated in the signals representative of the electrical power, analysis by the processor of the disturbances may result in information about the space, element, component, environment, and/or an occupant, if any, of the space. The information about the space and/or an occupant, if any, of the space, may be a result of analysis by the processor of the one or more items selected from a group consisting of frequency, waveform, amplitude, wavelength and harmonics, in the signals representative of the electrical power.

Information about the space, element, component, environment, and/or an occupant, if any, may be a result of analysis by the processor of one or more items from a group consisting of frequency, waveform, amplitude, wavelength and harmonics, in signals representative of the electrical power containing a reaction to disturbances in the signals representative of the electrical power.

One or more items versus time may be entered in a plot. The plot is a basis for information about an element, component, equipment, environment, and/or occupant. One or more certain patterns of the plot may be correlated with one or more pre-determined patterns representing specific behavior of the element, component, equipment, environment, and/or occupant.

If one or more certain patterns of the plot are correlated with the one or more pre-determined patterns representing specific behavior of the element, component, equipment, environment, and/or occupant, then one or more certain patterns of the plot may be indicative of the element, component, equipment, environment, and/or occupant, if any, having the certain behavior. The certain behavior of equipment, if any, may incorporate ramping on/off of furnaces, chiller performance, refrigerator usage, stove operation, inverters, motors, lighting activity, and/or other equipment operation at the space.

The one or more items versus time may be entered in a plot of amplitude versus time. The plot may be a basis for one or more models of a space. The one or more models may be updated periodically and/or iteratively with information derived from analysis of the signals from the sensor module. Virtually all models may be updated periodically and/or iteratively with information derived from analysis of the signals from a sensor module or other detection approach, analysis input and/or human input. Information about the element, component, environment, and/or an occupant, if any, of the space, may be obtained from an internet or other information source, such as other sensed data.

There may be an approach for non-intrusive monitoring of an element, incorporating non-intrusive obtaining data associated with a sensor or other detection approach of an element, processing the data into at least one model of the element, matching the model to one or more predefined models representing certain information, associating the certain information with the element from the matching of the model of the element with the one or more predefined models representing the certain information, and creating improved models based upon learning and training from disturbances, human input, previously improved models, and so forth. The approach may also incorporate non-intrusive obtaining additional data associated the element. The model of the element may learn the additional data and modify itself in response to the additional data. The element may be a utility power system. The one or more predefined models may incorporate models of electrical characteristics, mechanical characteristics, performance signatures, environmental affects, regression, and/or predictive aspects of the utility power system.

The approach may also incorporate taking user input and modifying the data processed into the model of the element in response to the user input. The element may be a utility power system for providing electricity to a building. The model of the element may be updated through real-time analysis of a response of the building to utility power system disturbances on a line between the utility power system and the building.

The approach may also incorporate creating a utility power system model as an electricity provider to one or more buildings, creating a user power system model of an electricity consumer at a connected side to the one or more buildings, modifying the utility power system model over time from data, and modifying the user power system model modified over time from data.

The element may be the electricity consumer. The user power system model may be modeled as a single block. The single block may be broken out into load blocks, and each load block may be equipment based on a signature of electricity use by the electricity consumer. Each load block based on the signature may be combined with a behavior analysis of each load block based on disturbances from the utility power system. Each load block based on the signature may be combined with ambient conditions. Human behavior may be identified based on characteristics of a load block.

If human behavior is a core need for non-intrusive obtaining data associated with an element, data from use of gas, water, telephone, and so forth, may be processed to create, update, and/or modify the model of the element and to make decisions about the human behavior.

Data may additionally be associated with an item associated with the element. The data may be selected from a group comprising electrical power usage, gas usage, sound emanation, movement of the element, movement of an item associated with the element, images of the element, images of an item associated with the element, lighting of the element, lighting of an item associated with the element, RF signals from an area proximate to the element, RF signals from an area proximate to an item associated with the element, and/or publicly available information about the element and an item associated with the element.

There may be a non-intrusive monitor system having a non-intrusive information acquisition mechanism, an analysis module connected to the non-intrusive acquisition mechanism, a modeling module connected to the analysis module, and a resultant module connected to the modeling module. Information may incorporate one or more items relevant to one or more elements. The modeling module may be for matching a model to an element based on one or more items relevant to the element. The model may imply other information about the element.

The element may be or have a space, person or persons, equipment, environment, behavior, system, and/or system of systems, and/or any combination of two or more of the space, person or persons, equipment, environment, behavior, system, and system of systems.

The system may also have a user interface connected to the resultant module and to the non-intrusive information acquisition mechanism. The user interface may control acquisition and collection of information, and/or receipt of selected information.

The non-intrusive information acquisition mechanism may acquire and collect information about the one or more elements. The information may incorporate one or more items of a group having waveforms of current and/or voltage of electrical power to an element, images of an element, sound signals from an element, RF signals from an area proximate to an element, background information about an element, and reactions of an element to one or more other items of the group.

In the present specification, some of the matter may be of a hypothetical or prophetic nature although stated in another manner or tense.

Although the present system has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. A remote non-intrusive monitor of a space of a building for occupants, comprising:
   a non-intrusive sensor module coupled to a power line for monitoring a space, the non-intrusive sensor module is configured to monitor the space from a position exterior a building encompassing the space; and
   a processor connected to the sensor module; and
   wherein:
   the sensor module senses data on the power line and provides signals representative of electrical power used at the space in response to power system disturbances in the power supplied to the building from a utility power system;
   the signals representative of the electrical power are analyzed by the processor; and analysis by the processor of the signals results in information about how a space and/or an element, component, environment, and/or occupant, if any, of the space responds to power system disturbances in the power supplied to the building.

2. The monitor of claim 1, wherein the information about the space and/or an occupant, if any, of the space, is a result of analysis by the processor of the one or more items selected from a group consisting of frequency, waveform, amplitude, wavelength and harmonics, in the signals representative of the electrical power.

3. The monitor of claim 2, wherein information about the space, element, component, environment, and/or an occupant, if any, is a result of analysis by the processor of one or more items from a group consisting of frequency, waveform, amplitude, wavelength and harmonics, in signals representative of the electrical power containing a reaction to disturbances in the signals representative of the electrical power.

4. The monitor of claim 2, wherein:
the one or more items versus time are entered in a plot;
the plot is a basis for information about an element, component, equipment, environment, and/or occupant; and
one or more certain patterns of the plot correlate with one or more pre-determined patterns representing specific behavior of the element, component, equipment, environment, and/or occupant.

5. The monitor of claim 4, wherein:
if one or more certain patterns of the plot, correlate with the one or more pre-determined patterns representing specific behavior of the element, component, equipment, environment, and/or occupant, then one or more certain patterns of the plot are indicative of the element, component, equipment, environment, and/or occupant, if any, having the certain behavior; and
the certain behavior of equipment, if any, comprise ramping on/off of furnaces, chiller performance, refrigerator usage, stove operation, inverters, motors, lighting activity, and/or other equipment operation at the space.

6. The monitor of claim 2, wherein:
the one or more items versus time are entered in a plot of amplitude versus time;
the plot is a basis for one or more models of a space; and
the one or more models are updated periodically and/or iteratively with information derived from analysis of the signals from the sensor module.

7. The monitor of claim 6, wherein all of the one or more models are updated periodically and/or iteratively with information derived from analysis of the signals from a sensor module or other detection approach, analysis input and/or human input.

8. The monitor of claim 1, wherein information about the element, component, environment, and/or an occupant, if any, of the space, is obtained from an internet or other information source, such as other sensed data.

9. A method for non-intrusive monitoring of an element, comprising:
non-intrusively obtaining data associated with a sensor or other detection approach of an element, wherein non-intrusively obtaining data comprises extracting data from an electric power line feeding a building with a sensor located exterior of the building and between a substation transformer and a site transformer;
processing the data into at least one model of the element;
matching the model to one or more predefined models representing certain information;
associating the certain information with the element from the matching of the model of the element with the one or more predefined models representing the certain information; and
creating improved models based upon learning and training from obtained data associated with the sensor in response to disturbances from a utility power system, human input, and previously improved models.

10. The method of claim 9, further comprising:
non-intrusive obtaining additional data associated with the element; and
wherein the model of the element learns the additional data and modifies itself in response to the additional data.

11. The method of claim 9, wherein:
the element is a utility power system; and
the one or more predefined models comprise models of electrical characteristics, mechanical characteristics, performance signature, environmental affects; regression, and/or predictive aspects of the utility power system.

12. The method of claim 9, further comprising taking user input and modifying the data processed into the model of the element in response to the user input.

13. The method of claim 9, wherein:
the element is a utility power system for providing electricity to a building; and
the model of the element is updated through real-time analysis of a response of the building to utility power system disturbances on a line between the utility power system and the building.

14. The method of claim 9, further comprises:
creating a utility power system model as an electricity provider to one or more buildings;
creating a user power system model of an electricity consumer at a connected side to the one or more buildings;
modifying the utility power system model over time from data; and
modifying the user power system model modified over time from data; and
wherein:
the element is the electricity consumer;
the user power system model is modeled as a single block;
the single block is broken out into load blocks;
each load block is equipment based on a signature of electricity use by the electricity consumer;
each load block based on the signature is combined with a behavior analysis of each load block based on disturbances from the utility power system;
each load block based on the signature is combined with ambient conditions; and
human behavior is identified based on characteristics of a load block.

15. The method of claim 14, wherein if human behavior is a core need for non-intrusive obtaining data associated with an element, data from use of gas, water, telephone, and so forth, are processed to create, update, and/or modify the model of the element and to make decisions about the human behavior.

16. The monitor of claim 9, wherein:
the data can additionally be associated with an item associated with the element; and
the data are selected from a group comprising electrical power usage, gas usage, sound emanation, movement of the element, movement of an item associated with the element, images of the element, images of an item associated with the element, lighting of the element, lighting of an item associated with the element, RF signals from an area proximate to the element, RF signals from an area proximate to an item associated with the element, and/or publicly available information about the element and an item associated with the element.

17. A non-intrusive monitor system comprising:
a non-intrusive information acquisition mechanism comprising one or more non-intrusive sensors configured to be coupled to an electric power line feeding a building at a position exterior the building and between a substation transformer and a site transformer, the building including a space to be monitored by the non-intrusive monitor system;
an analysis module connected to the non-intrusive acquisition mechanism;
a modeling module connected to the analysis module; and
a resultant module connected to the modeling module; and
wherein:
the sensor senses information from the electric power line at a location between the substation transformer and the site transformer and provides signals representative of electrical power used at the building in response to power system disturbances in power supplied to the building from a utility power system;
the modeling module is for matching a model on a graph plot to an element based on comparing the model on a graph plot to one or more graph plots of one or more items relevant to the element; and
the model implies other information about the element.

18. The system of claim 17, wherein the element comprises a space, person or persons, equipment, environment, behavior, system, and/or system of systems, and/or any combination of two or more of the space, person or persons, equipment, environment, behavior, system, and system of systems.

19. The system of claim 17, further comprising:
a user interface connected to the resultant module and to the non-intrusive information acquisition mechanism; and
wherein the user interface controls acquisition and collection of information, and/or receipt of selected information.

20. The system of claim 18, wherein:
the non-intrusive information acquisition mechanism acquires and collects information about the one or more elements; and
the information comprises one or more items of a group comprising:
waveforms of current and/or voltage of electrical power to an element;
images of an element;
sound signals from an element;
RF signals from an area proximate to an element;
background information about an element; and
reactions of an element to one or more other items of the group.

* * * * *